Figure 1:
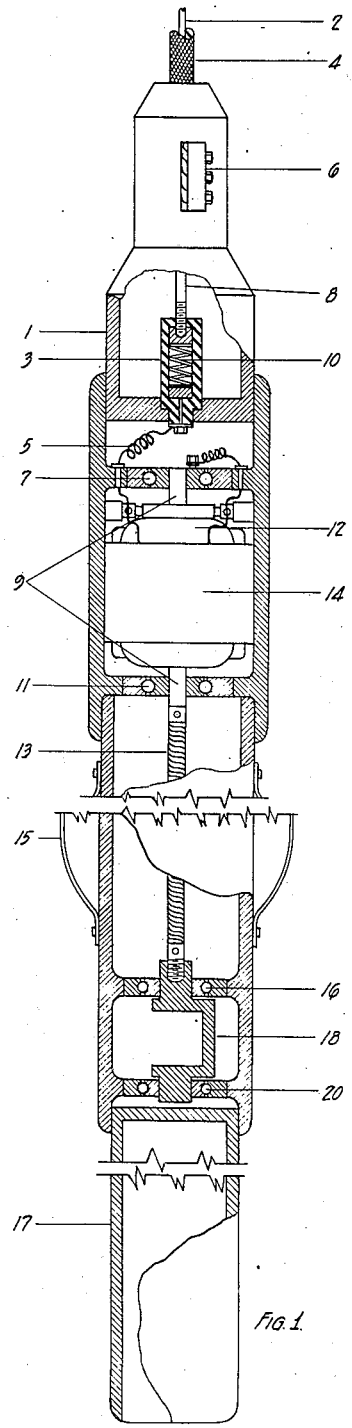

March 9, 1937.  C. R. DALE  2,072,982

METHOD AND APPARATUS FOR CEMENTING WELLS

Filed June 22, 1936

Inventor: Clarence R. Dale

By his Attorney:

Patented Mar. 9, 1937

2,072,982

UNITED STATES PATENT OFFICE 2,072,982

METHOD AND APPARATUS FOR CEMENTING WELLS

Clarence R. Dale, Los Angeles, Calif., assignor to Dale Service Corporation, a corporation of California Application June 22, 1936, Serial No. 86,553

5 Claims. (Cl. 166—1)

This invention pertains to the art of cementing oil or gas wells and relates more particularly to a method and apparatus for effectively sealing off water-bearing strata traversed by a borehole by means of cementing material placed in said borehole and subjected to high-frequency mechanical vibration.

In drilling oil or gas wells, boreholes often pass through water-bearing strata as well as through oil-bearing formations. Since it is essential that water be excluded from oil-producing wells, it becomes necessary to shut off such water-bearing strata by cementing the wells.

For this purpose, cement plugs are usually placed about the lower end of a casing set in a borehole above an oil sand, or else may be placed in intermediate or top zones, for example, if a previously passed oil-bearing layer becomes depleted and allows water to penetrate into the well.

In cementing off such intermediate or top zones, and especially in cases where it is not possible or desirable to withdraw the casing from the well, cementing is often done through perforated casing or liners.

Many difficulties are encountered in cementing wells and result in a large percentage of unsatisfactory cementing jobs, especially when cementing is done through perforated liners.

For example, if the cement charge is simply dumped into the casing in the expectation that it will pass through the lower end of the casing, or through its perforations, it often happens that the hydrostatic pressure is not sufficient to force the cement out of the casing. If fluid pressure is applied on top of the cement charge, the latter may become diluted with the pressure fluid and incapable of forming a strong bond with the walls of the borehole. If the cement charge is follow by a packer or plug, and fluid pressure is applied on top of the latter, porous formations lying above the cementing level may take up the pressure fluid so that a sufficiently high pressure can not be developed to force the cement charge out of the casing.

It is the purpose of the present invention to provide a method and apparatus whereby a cement charge may be effectively forced out of the casing and into contact with the walls of the borehole without the necessity of applying high pressures.

It is another purpose of this invention to provide a method whereby the cement charge is made to form a stronger and more perfect bond with the walls of the borehole than is possible by known methods.

It is a further object of this invention to provide a method whereby cement charges of greater density and smaller water content may be effectively used in oil-well cementing operations, and a cement plug of greater strength and better sealing properties is ultimately obtained due to the treatment to which the cementing material is subjected during the cementing operation.

Briefly stated, the process of this invention consists in lowering a charge of fluid cement into a borehole and subjecting it to the action of a special high-frequency vibrator, as will be seen from the following description, wherein reference is made to a preferred embodiment of the vibrator, to which, however, the method of this invention is in no way limited.

Figure 2:
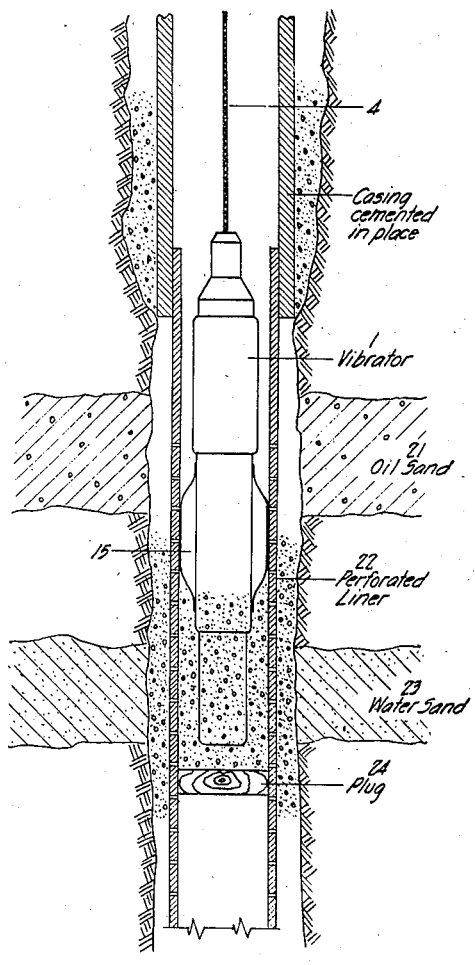

In the drawing:

Figure 1 shows a diagrammatic elevation view, partly in cross-section, of the vibrator, and Figure 2 shows the arrangement of apparatus used for carrying out the process of this invention.

Referring to Figure 1, the vibrator consists of a fluid-tight casing or housing 1 adapted to be lowered into a well and capable of withstanding the high pressures which may occur in wells. The casing is suspended by means of line clamps 6, on a cable 4, comprising an insulated electrical conductor, or conductors 2, which extends to the surface and is connected, by means of a suitable hoist and slip rings, to any desired source of electrical current, which may be either direct current or alternating current. The housing 1 holds a motor 14, to which electrical power is delivered from the surface in a manner understood by those familiar with electrical devices, as, for example, by means of conductors 2 and 8, spring 10, carried by an insulating bushing 3, and in insulated conductor 5, one of the electrodes of the E. M. F. source on the surface and one of the electrodes of motor 14 being grounded. The motor 14, which may be of any desired type, although the use of series wound D. C. motors is particularly advantageous, due to wide variations of speed possible, has a rotor 12 rotating on a shaft 9, provided with ball bearings 7 and 11 at either side of the motor. The lower end of shaft 9 is connected to a flexible shaft 13, or a solid shaft having a flexible coupling at each end. The flexible shaft 13 transmits the rotational motion of the motor to an eccentric or unbalancing element 18 supported by ball bearings 16 and 20. The high speed rotation of the unbalanced element 18 generates vibrations of a high frequency. The lower end of casing 1 may comprise an elongated hollow tube 17 whose length may be varied in accordance with different well cementing problems. To prevent a whipping action of the vibrator unit against the casing or walls of the well, the housing 1 is provided with any desired number of spring guides 15, which serve also to center the vibrator and to prevent it from turning in the direction of rotation of the rotor.

The vibrator may be used for any type of well cementing operations, for example, for cementing around the lower end of an unperforated casing or liner, or for cementing an uncased borehole. Its use is, however, most advantageous in placing a cement charge through a perforated casing or liner.

As an illustrative example, and with reference to Figure 2, the following procedure may be followed in case where a perforated liner 22 is set at the level of the water sand 23 which it is desired to shut off by cementing. A packer or plug 24 is set in the liner below the water sand 23. A desired charge of a fluid cement mixture is placed in the liner above the packer 24 by pumping or dumping by bailing. The vibrator 1 is then lowered into the borehole by means of cable 4, and is firmly held against any rotational or whipping motion by the friction of the centering guide springs 15 against the walls of the liner. The motor is started and rotates at any desired speed between about 3500 and 8000 revolutions per minute, the speed being controlled from the surface. The high-frequency vibrating action to which the cementing charge is subjected causes the cement particles to move away from the vibrator through the perforations of the liner. If desired, fluid pressure may be applied at the same time on top of the cementing charge. Since the use of the vibrator permits the use of cement mixtures of smaller water content than are commonly used, there is little danger of unduly diluting the cement charge with the pressure fluid. Commonly used cement mixtures comprise about 40% of water, as may be seen from the following authorities: Uren, "Petroleum Production Engineering", McGraw-Hill, second edition, 1934, pages 387-391, and American Petroleum Institute, Production Bulletin No. 212, vol. 14 (IV), Proceedings (Nov. 1933), page 70. The action of the vibrator not only drives the cement particles through the perforations of the liners, but also drives them against the walls of the borehole and into the formation, so that a strong bond is formed between the formation and the cement seal into which the cement charge ultimately solidifies. Vibration has also a beneficial effect in compacting the cement, driving the water off, and acting to form a cement mass of greater density and strength than that obtainable by known methods.

After a cementing charge had been placed in the liner and driven by vibrating through the perforations, which takes a period of time of from 5 to 10 minutes, a second charge may be lowered into the borehole and vibrated in the same manner. This operation may be repeated any desired number of times, until a sufficient amount of cementing material has been forced through the perforations. The cementing charge thus placed around the liner is of a very uniform nature, and is free of channeling which very often impairs the water-impervious qualities of cement plugs placed by conventional methods. The cement is then allowed to set for a desired length of time, after which that part of it which remains inside the liner is drilled out, and the well may be put on production.

It is understood that although reference has been made in the above description to a preferred embodiment of a vibrating device, the cementing of wells according to the method of this invention may be carried out with vibrators of a somewhat modified construction. For example, the vibrator may be attached to the end of a string of tubing and lowered therewith into the well. Likewise, it is possible to use compressed air instead of electricity as a source of motive power.

I claim as my invention:

1. In the process of cementing wells provided with a perforated casing, the steps of placing a cement charge in the perforated casing and driving it through the perforations of the casing into the space between the casing and the walls of the well by subjecting said cement charge to high frequency vibration.

2. In the process of cementing wells provided with a perforated casing, the steps of placing a cement charge in a perforated casing, placing a vibrator within the cement mixture, and driving the latter through the perforations of the casing into the space between the casing and the walls of the well by subjecting said cement charge to high frequency vibration.

3. In the process of cementing wells provided with a perforated casing, the steps of placing a packer in the perforated casing, placing a cement charge above the packer, and driving said cement charge through the perforations of the casing into the space between the casing and the walls of the well by subjecting said cement charge to high frequency vibration.

4. In the process of cementing wells provided with a perforated liner, the steps of placing in the perforated casing a cement charge of a lower water content than that of prior practice, said content being sufficiently low to prevent said cement charge form passing through the perforations under its own head, and forcing said charge through the perforations of the casing into the space between the casing and the walls of the well by subjecting it to high-frequency vibration.

5. In the process of cementing wells provided with a perforated liner, the steps of placing in the perforated casing a cement charge having a water content substantially less than 35% by weight of the dry cement, and forcing said charge through the perforations of the casing into the space between the casing and the walls of the well by subjecting it to high-frequency vibration.

CLARENCE R. DALE.